US012558787B2

(12) United States Patent
Feng et al.

(10) Patent No.: US 12,558,787 B2
(45) Date of Patent: Feb. 24, 2026

(54) ROBOTIC ARM OBSTACLE AVOIDING PATH PLANNING METHOD

(71) Applicant: GUANGDONG UNIVERSITY OF TECHNOLOGY, Guangzhou (CN)

(72) Inventors: Sang Feng, Guangzhou (CN); Xilong Zhang, Guangzhou (CN); Xiaotao Huang, Guangzhou (CN); Yanyang Chen, Guangzhou (CN); Shutao Chen, Guangzhou (CN); Yan Hu, Guangzhou (CN); Yiming Huang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 19/254,134

(22) Filed: Jun. 30, 2025

(65) Prior Publication Data

US 2025/0326121 A1      Oct. 23, 2025

Related U.S. Application Data

(63) Continuation of application No. PCT/CN2024/082578, filed on Mar. 20, 2024.

(30) Foreign Application Priority Data

Apr. 11, 2023      (CN) ......................... 202310385761.2

(51) Int. Cl.
        *B25J 9/16*             (2006.01)
        *B25J 19/02*            (2006.01)
        *G05B 19/18*            (2006.01)
(52) U.S. Cl.
        CPC .......... *B25J 9/1666* (2013.01); *B25J 9/1697* (2013.01); *B25J 19/023* (2013.01); *G05B 19/18* (2013.01);
                                                        (Continued)

(58) Field of Classification Search
        CPC ...... B25J 9/1664; B25J 9/1666; B25J 9/1676; B25J 9/1697; B25J 19/021–023;
                                                        (Continued)

(56) References Cited

U.S. PATENT DOCUMENTS

| | | | | |
|---|---|---|---|---|
| 10,303,180 | B1 * | 5/2019 | Prats .................... | G05D 1/0212 |
| 2015/0251315 | A1 * | 9/2015 | Brandenberger .. | G05B 19/4061 901/14 |
| 2020/0086486 | A1 | 3/2020 | Graichen | |

FOREIGN PATENT DOCUMENTS

| | | |
|---|---|---|
| CN | 109434836 A | 3/2019 |
| CN | 110262478 A | 9/2019 |

(Continued)

OTHER PUBLICATIONS

Choset, Howie, "Robotic Motion Planning: Potential Functions," Jul. 16, 2007, Lecture Slides, Carnegie Mellon University (Year: 2007).*

(Continued)

*Primary Examiner* — Spencer D Patton
(74) *Attorney, Agent, or Firm* — Cooper Legal Group, LLC

(57)                    ABSTRACT

A robotic arm obstacle avoiding path planning method is provided. The method includes the following steps: step 1: simplifying the robotic arm model and obstacles, determining robotic arm joint points, and adopting virtual joint interpolation to interpolate connecting rods between adjacent joints; employing spherical bounding boxes at each joint point to envelop and replace the robotic arm model, enabling complete substitution for distance calculation when the robotic arm assumes any posture; step 2: adopting an eye-to-hand configuration to position the depth camera, acquiring in real time the point cloud information of the robotic arm and obstacles in the workspace, and using a (Continued)

robot real-time filtering package to filter out the point cloud information of the robotic arm itself.

5 Claims, 8 Drawing Sheets

(52) U.S. Cl.
CPC .............. *G05B 2219/40428* (2013.01); *G05B 2219/40474* (2013.01); *G05B 2219/40476* (2013.01); *G05B 2219/40492* (2013.01)
(58) Field of Classification Search
CPC ........... G05B 2219/40474; G05B 2219/40475; G05B 2219/40476; G05B 2219/40492; G05B 2219/40428
See application file for complete search history.

(56) References Cited

FOREIGN PATENT DOCUMENTS

| | | | |
|---|---|---|---|
| CN | 111421540 | A | 7/2020 |
| CN | 112276953 | A | 1/2021 |
| CN | 112677153 | A | 4/2021 |
| CN | 113799141 | A | 12/2021 |
| CN | 114589701 | A | 6/2022 |
| CN | 115416016 | A | 12/2022 |
| CN | 115502961 | A | 12/2022 |
| CN | 116352714 | A | 6/2023 |
| KR | 101076008 | B1 | 10/2011 |

OTHER PUBLICATIONS

Notice of first Office action dated Aug. 8, 2023 in SIPO application No. CN202310385761.2, 9 pages.
Retrieval report—First search dated Aug. 2, 2023 in SIPO application No. CN202310385761.2, 7 pages.
Notification to Grant Patent Right for Invention dated Sep. 5, 2023 in SIPO application No. CN202310385761.2, 3 pages.
International Search Report issued in corresponding PCT Application No. PCT/CN2024/082578 dated Apr. 22, 2024, 10 pages.
Wan Chao et al., "One Evolutionary Artificial Potential Field Method of the Multiple Mobile Robots' Local Collision Avoidance", Science and Technology Square, Jan. 31, 2011, pp. 35-37 with English abstract.

* cited by examiner

Robotic arm

Camera

ROBOTIC ARM OBSTACLE AVOIDING PATH PLANNING METHOD

CROSS-REFERENCE TO RELATED APPLICATIONS

This application is a continuation of International Patent Application No. PCT/CN2024/082578, filed on Mar. 20, 2024, and claims priority of Chinese Patent Application No. 202310385761.2, filed on Apr. 11, 2023. The entire contents of International Patent Application No. PCT/CN2024/082578 and Chinese Patent Application No. 202310385761.2 are incorporated herein by reference.

TECHNICAL FIELD

The present disclosure relates to the technical field of robotic arm obstacle avoiding, and in particular to a robotic arm obstacle avoiding path planning method.

BACKGROUND

As robotic arms have been applied in increasingly more fields, obstacle avoiding function of robotic arms in dynamic environments, such as multi-machine collaboration and human-machine collaboration, has become particularly important. Robotic arm obstacle avoiding refers to obtaining a reasonable path in a complex environment through pre-planning, enabling the robotic arm to bypass obstacles to avoid collisions. Currently, a mature, widely applicable real-time obstacle avoiding technical scheme for robotic arms has yet to be established for practical industrial production. The main existing problems in robotic arm obstacle avoiding technology include the following: the presence of multiple joints, strong flexibility, and diverse postures in robotic arms impossible to be considered as simple mass points. When moving in a dynamic scenario, robotic arms should use real-time planning algorithms, so as to accommodate for the real-time changes of obstacles. However, in dynamic planning, robotic arms easily trigger the local minima, and then stop moving.

SUMMARY

(1) Technical Problem to be Solved

To address the shortcomings of existing technologies, the present disclosure provides a robotic arm obstacle avoiding path planning method, featuring: firstly, a simplified model approach, which facilitates subsequent distance calculation for obstacle avoiding, achieved by employing virtual joint interpolation for the connecting rods between adjacent joints, and using spherical bounding boxes at joints to envelop the robotic arm as a model substitute; secondly, enhanced speed and directionality in global path planning, realized by employing the rapidly-exploring random tree connect (RRT-Connect) as the foundation, and controlling the alternating growth of random trees for global path planning; thirdly, effective prevention of local minima and unreachable goal problems, accomplished through the introduction of guiding forces and distance influence factors, to modify the repulsive force in the artificial potential field method.

(2) Technical Scheme

To achieve the above objectives, the present disclosure provides the following technical scheme:

A robotic arm obstacle avoiding path planning method, including the following steps:

Step 1: Simplifying the robotic arm model and obstacles, determining robotic arm joint points, adopting virtual joint interpolation to interpolate connecting rods between adjacent joints; employing spherical bounding boxes at each joint point to envelop and replace the robotic arm model, enabling complete substitution for distance calculation when the robotic arm assumes any posture;

Step 2: Adopting an eye-to-hand configuration to position the depth camera, acquiring in real time the point cloud information of the robotic arm and obstacles in the workspace, and using a robot real-time filtering package to filter out the point cloud information of the robotic arm itself, retaining only the obstacle point cloud information;

Step 3: Before the robotic arm moves, using the RRT-Connect algorithm to perform path planning in the static environment where the robotic arm is located, leveraging its completeness to obtain a feasible globally planned path;

Step 4: Controlling the robotic arm to move along the globally planned path, acquiring the real-time obstacle point cloud information in the robotic arm's workspace, and calculating the distance between the obstacle point cloud and the robotic arm joint points in the robotic arm's coordinate system to obtain the shortest distance;

where when the shortest distance is less than the set safety distance, the robotic arm is controlled to use a local planner and an improved artificial potential field method is adopted to plan a local path for real-time obstacle avoiding;

Step 5: Implementing obstacle avoiding through local path planning using the improved artificial potential field method; determining in real time the distance and position vector between the robotic arm end and the goal point, and determining the magnitude of the attractive force exerted by the goal point on the robotic arm end based on the distance and position vector between the robotic arm end and the goal point;

Step 6: Introducing a guiding force to the robotic arm end, which enables the robotic arm to move to the next position for re-planning when trapped in a local minimum;

Step 7: Introducing a pre-planning mechanism in the local path planning; and

Step 8: Incorporating a following mechanism in the local path planning.

Optionally, the RRT-Connect algorithm is based on a random sampling method that connects randomly sampled points to form a feasible path. The connection process resembles tree growth, hence the term "random tree." This algorithm improves path planning speed by simultaneously growing two random trees from the start point and the goal point until they converge to obtain a feasible path.

To avoid excessive randomness in sampling and enhance path directionality, the RRT-Connect algorithm also adopts an alternating method for random tree growth.

Optionally, the goal point refers to the goal position where the robotic arm is controlled to reach. The function formula for determining the distance and position vector between the robotic arm end and the goal point in real time and calculating the magnitude of the attractive force based on these parameters is as follows:

$$F_{att} = -\nabla(U_{att}) = \xi' \rho(q, q_{goal}),$$

where $\rho(q, q_{goal})$ is the Euclidean distance between the robotic arm end and the goal point; $U_{att}$ is the improved attractive potential field function, and $$U_{att} = \frac{1}{2}\xi' \rho^2(q, q_{goal});$$

$\xi'$ is the dynamic gain coefficient of the attractive force, expressed as $\xi = k*(e^{-\rho(q, q_{goal})}$ where the dynamic gain coefficient is inversely proportional to the distance between the robotic arm and the goal point, with the minimum gain coefficient at the starting point, thereby enabling adjustment of the attractive force magnitude to prevent excessive attraction that could cause collisions between the robotic arm and obstacles, ensuring the robotic arm obtains a safe and smooth path.

The shortest distance between the robotic arm joint points and the obstacle point cloud is determined in real time. When the shortest distance is greater than the set safety distance, the repulsive force of the obstacle on the robotic arm is 0, and when the shortest distance is less than the set safety distance, the magnitude of the repulsive force is determined based on the joint points on the robotic arm and the nearest obstacle point cloud information, and the function formula for the repulsive force magnitude is:

$$F_{repi} = -\nabla(U_{rep}) = \begin{cases} F_{rep1i} + F_{rep2i}, & \rho_i(q, q_{obst}) \le \rho_0 \\ 0, & \rho_i(q, q_{obst}) > \rho_0 \end{cases},$$

where $U_{rep}$ is the repulsive potential field generated by the obstacle; $\rho_0$ is the safety distance radius; $\rho_i(q, q_{obst})$ is the Euclidean distance between the robotic arm end and the i-th obstacle;

$F_{rep1i}$ is the repulsive force component, with direction from the obstacle pointing to the robotic arm end, and magnitude is:

$$F_{rep1i} = m\left|\frac{1}{\rho(q, q_{goal})} - \frac{1}{\rho_0}\right|\frac{\rho^n(q, q_{goal})}{\rho_i^2(q, q_{obst})},$$

$F_{rep2i}$ is the attractive force component, with direction from the robotic arm end pointing to the goal point, and magnitude is:

$$F_{rep2i} = \frac{n}{2}m\left|\frac{1}{\rho_i(q, q_{obst})} - \frac{1}{\rho_0}\right|\rho^{n-1}(q, q_{goal}).$$

When the robotic arm uses the local planner to plan the path, the combined force generated by the attractive force and repulsive force guides the movement of the robotic arm.

Optionally, the function formula for the guiding force is:

$$F_a = \begin{cases} \begin{cases} 1, & \rho(q, q_{obst}) > \rho_0/2 \\ 0.5, & \rho(q, q_{obst}) \le \rho_0/2 \end{cases}, s = 1 \\ a*x, & s > 1 \end{cases}.$$

The function formula for the combined force when falling into a local minimum:

$$F_{comb} = F_{att} + \sum_{i=1}^{s}F_{repi} + F_a,$$

where s is the number of obstacles; a is the guiding force coefficient; the value range of x is [1,10]; the value of a varies with the number of obstacles and the distance between the robotic arm and obstacles. When the number of obstacles is 1, if the distance between the robotic arm and the obstacle is greater than half of the safety distance, then a takes the value of 1, otherwise a takes the value of 0.5; when the number of obstacles is greater than 1, a monotonic increasing function is used as the guiding function to assign a value to a until the robotic arm escapes the local minimum point. If the next position still falls into a local minimum, the above method is repeated.

Optionally, to solve the problem that the goal point may not be reached, the improved artificial potential field method introduces a distance influence factor to the repulsive force, which changes the magnitude of the repulsive force generated by obstacles near the goal point, making the repulsive force generated by obstacles within a certain distance from the goal point zero, thereby preventing the robotic arm from failing to reach the goal point. When the robotic arm is far from the goal point, it is still affected by the repulsive force from obstacles, retaining obstacle avoiding capability. The improved repulsive force formula is:

$$U_{rci}(q) = \begin{cases} \frac{1}{2}k_{rep}\left(\frac{1}{\rho_i(q, q_{obst})} - \frac{1}{\rho_0}\right)^2 \dot{e}_i(q, q_{obst}), & \rho_i(q, q_{obst}) \le \rho_0 \\ 0, & \rho_i(q, q_{obst}) > \rho_0 \end{cases},$$

where $\dot{e}_i(q, q_{obst})$ represents the unit vector from the i-th obstacle pointing to the robotic arm end; $k_{rep}$ is a positive real number representing the repulsive force coefficient;

The total repulsive force is the cumulative effect of the repulsive forces from each obstacle.

Optionally, the pre-planning mechanism refers to adopting a simultaneous planning-and-moving approach during motion. When the robotic arm is moving along the locally planned path S2 based on the previous frame's environmental information and has not yet stopped, it acquires the current frame's environmental information and uses it as data to pre-plan a new local path S3. This local path S3 must be continuous with the previous local path S2, ensuring that when the robotic arm completes its motion along local path S2, it may immediately continue moving along local path S3, thereby maintaining motion continuity.

Optionally, the following mechanism may be divided into a goal-following mechanism and a path-following mechanism. After completing obstacle avoiding, if the robotic arm may return to the globally planned path under the combined force, it will continue moving toward the goal point along the globally planned path—this is called the path-following mechanism. If the robotic arm may not return to the globally planned path, it will move toward the goal point under the combined force—this is called the goal-following mechanism. The robotic arm employs the following mechanism throughout the entire motion process.

(3) Beneficial Effects

Compared with the prior art, the present disclosure provides a robotic arm obstacle avoiding path planning method, which has the following beneficial effects.

The robotic arm obstacle avoiding path planning method adopts virtual joint interpolation to interpolate connecting rods between adjacent joints, and then envelops the robotic arm with spherical bounding boxes to simplify the robotic arm model, while facilitating distance calculation in the obstacle avoiding process.

The robotic arm obstacle avoiding path planning method employs the RRT-Connect algorithm to perform global path planning in a static environment, which may quickly obtain a feasible path. By controlling the alternate growth of random trees, the directionality of the path is improved, and due to its completeness, a feasible path may be found given sufficient time.

The robotic arm obstacle avoiding path planning method, compared with the conventional artificial potential field method, introduces a guiding force and a distance influence factor in the improved artificial potential field method, effectively avoiding the problems of motion cessation and oscillation caused by falling into local minima and the unreachable goal problem caused by repulsive force effects near the goal point, enabling the robotic arm to move normally to the goal point.

DETAILED DESCRIPTION OF THE EMBODIMENT

The technical scheme in the embodiment of the present disclosure will be clearly and completely described below with reference to the accompanying drawings in the embodiment of the present disclosure.

Figure 1:
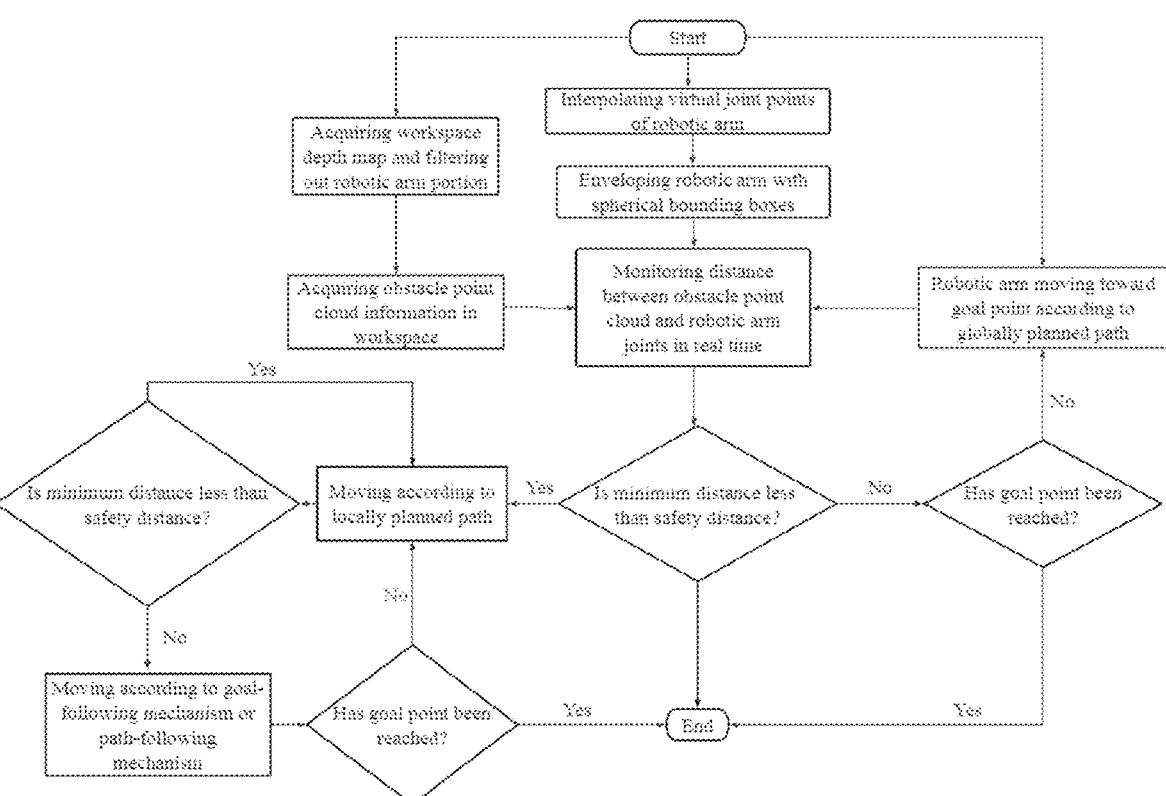
FIG. 1 is a flowchart of the present disclosure.
Figure 2:
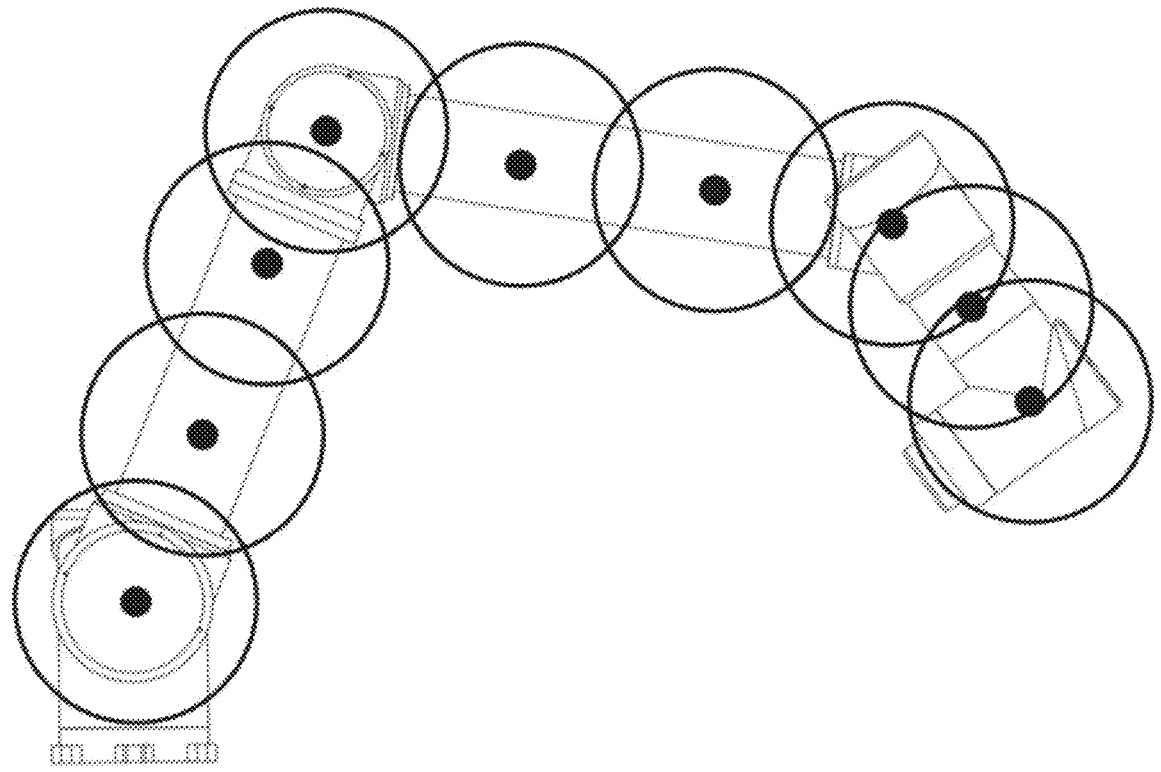
FIG. 2 is a simplified model diagram of setting bounding spheres at joints in the present disclosure.
Figure 3:
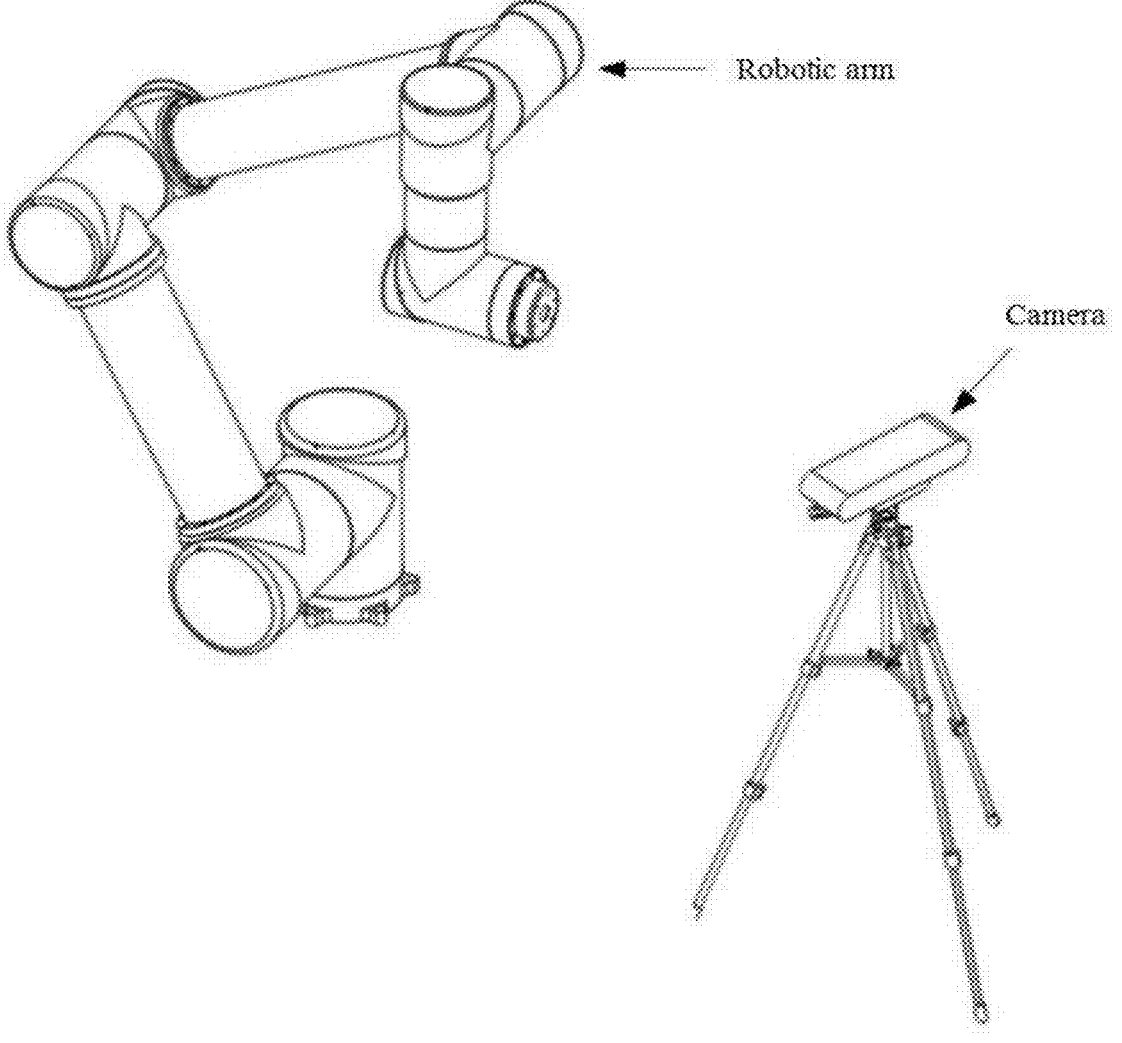
FIG. 3 is a diagram of an eye-to-hand camera arrangement in the present disclosure.
Figure 4:
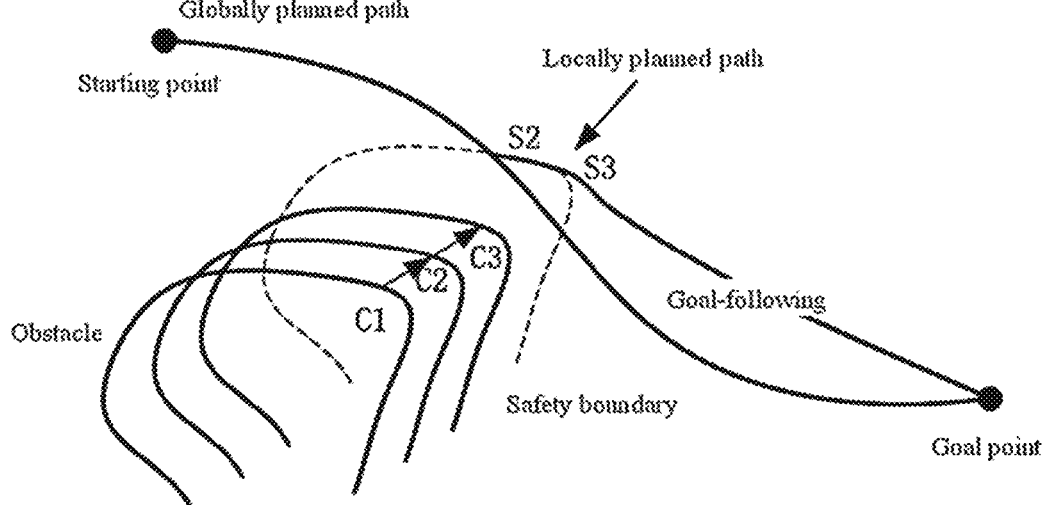
FIG. 4 is a schematic diagram of a pre-planning mechanism in the present disclosure.
Figure 5A:
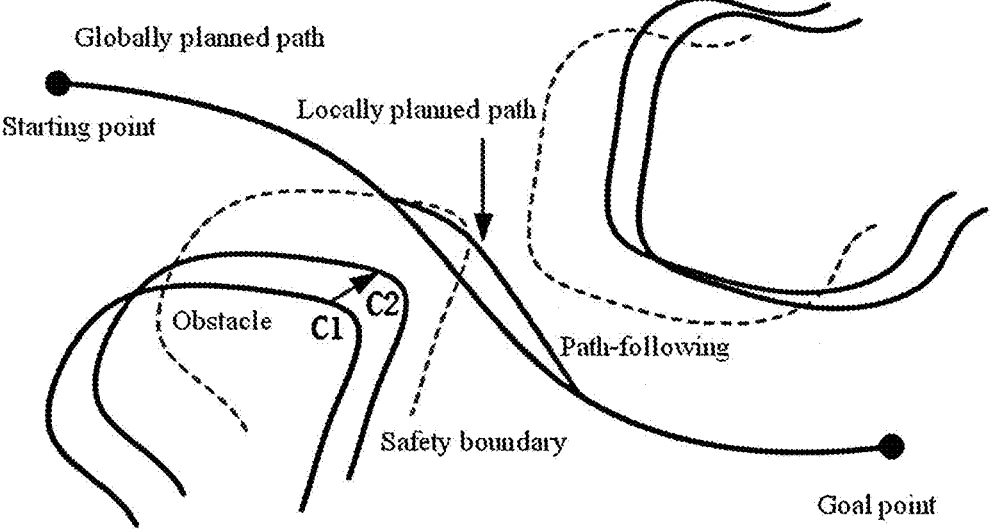
FIG. 5A is a schematic diagram of a path-following mechanism in the present disclosure.
Figure 5B:
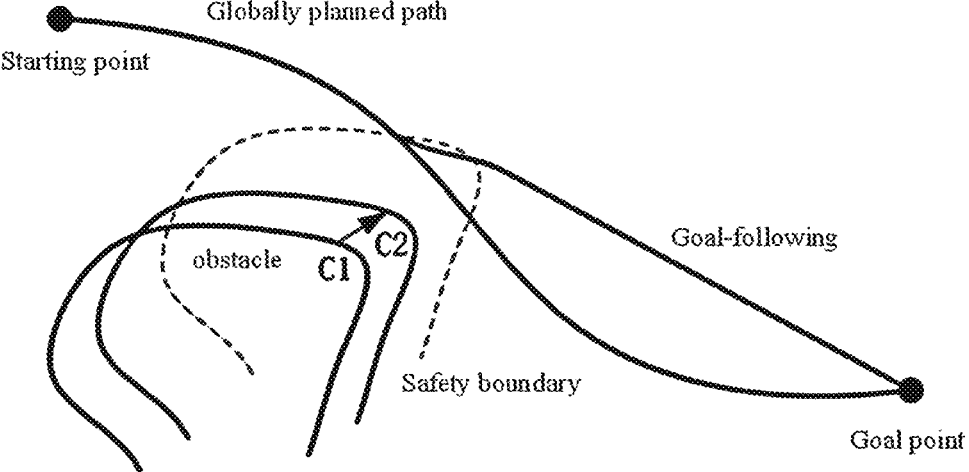
FIG. 5B is a schematic diagram of a goal-following mechanism in the present disclosure.
Figure 6A:
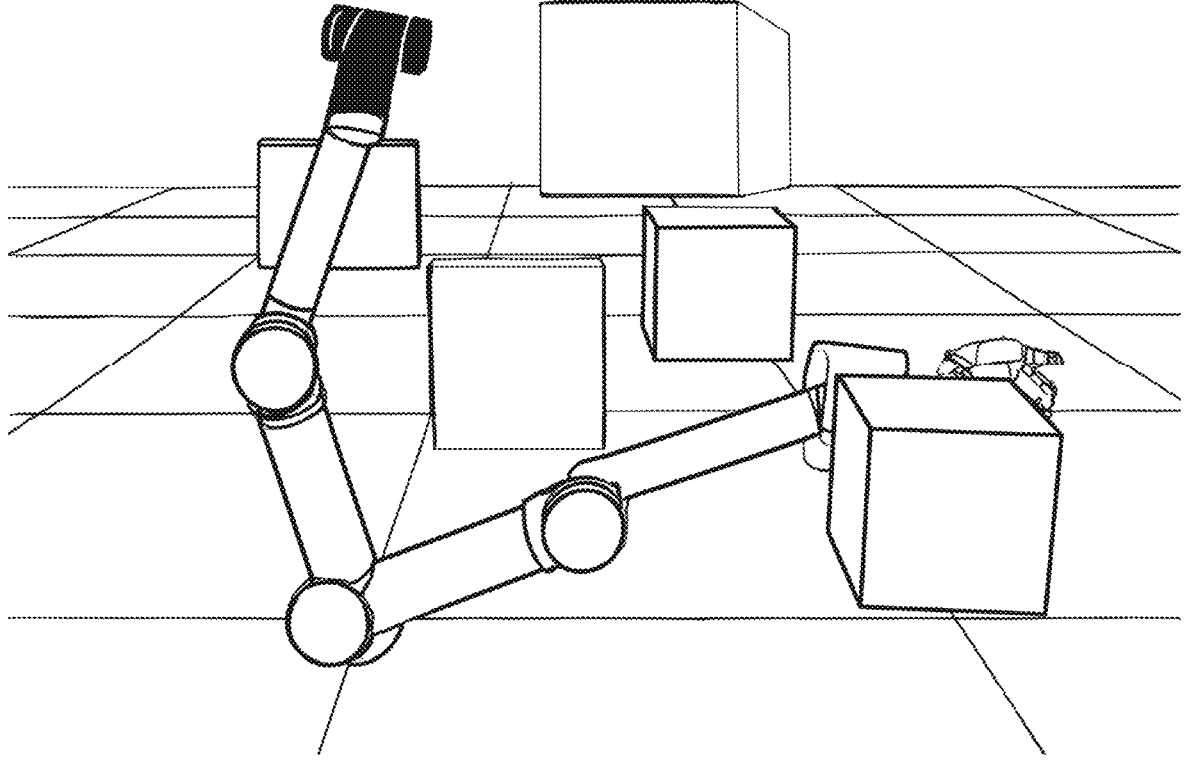
FIG. 6A is a simulation diagram of obstacle avoiding before the movement of the robotic arm in the present disclosure.
Figure 6B:
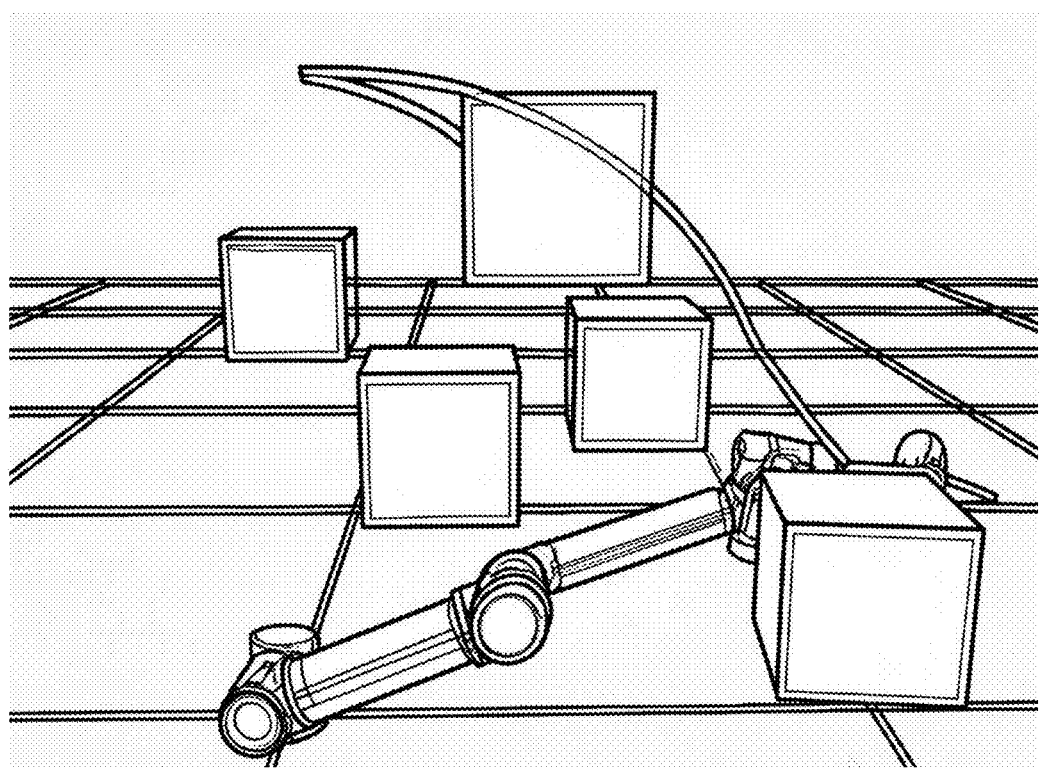
FIG. 6B is a simulation diagram of obstacle avoiding after the movement of the robotic arm in the present disclosure.

As shown in FIG. 1, FIG. 2, FIG. 3, FIG. 4, FIG. 5A, FIG. 5B, FIG. 6A and FIG. 6B, a robotic arm obstacle avoiding path planning method includes the following steps:

Step 1: Simplifying the robotic arm model and obstacles (see FIG. 2), determining robotic arm joint points, and adopting virtual joint interpolation to interpolate connecting rods between adjacent joints, employing spherical bounding boxes at each joint point to envelop and replace the robotic arm model, and enabling complete substitution for distance calculation when the robotic arm assumes any posture;

Step 2: Adopting an eye-to-hand configuration to position the depth camera (see FIG. 3), acquiring in real time the point cloud information of the robotic arm and obstacles in the workspace, and using a robot real-time filtering package to filter out the point cloud information of the robotic arm itself while retaining only the obstacle point cloud information;

Step 3: Before moving the robotic arm, using the rapidly-exploring random tree connect (RRT-Connect) algorithm to perform path planning in the static environment where the robotic arm is located, and leveraging its completeness to obtain a feasible globally planned path.

The RRT-Connect algorithm is based on a random sampling method that connects randomly sampled points to form a feasible path. The connection process resembles tree growth, hence the term "random tree." This algorithm improves path planning speed by simultaneously growing two random trees from the start point and the goal point until they converge to obtain a feasible path. To avoid excessive randomness in sampling and enhance path directionality, the RRT-Connect algorithm also adopts an alternating method for random tree growth.

Step 4: Controlling the robotic arm to move along the globally planned path, acquiring in real time the obstacle point cloud information in the robotic arm's workspace, and calculating the distance between the obstacle point cloud and the robotic arm joint points in the robotic arm's coordinate system to obtain the shortest distance.

When the shortest distance being less than the set safety distance, the robotic arm is controlled to use a local planner and an improved artificial potential field method is adopted to plan a local path for real-time obstacle avoiding.

Step 5: Implementing obstacle avoiding through local path planning using the improved artificial potential field method, determining in real time the distance and position vector between the robotic arm end and the goal point, and calculating the magnitude of the attractive force exerted by the goal point on the robotic arm end based on this distance and position vector;

Where the goal point refers to the goal position where the robotic arm is controlled to reach; the function formula for determining the distance and position vector between the robotic arm end and the goal point in real time and calculating the magnitude of the attractive force based on these parameters is:

$$F_{att} = -\nabla(U_{att}) = \xi' \rho(q, q_{goal}),$$

where $\rho(q, q_{goal})$ is the Euclidean distance between the robotic arm end and the goal point; $U_{att}$ is the improved attractive potential field function, and $$U_{att} = \frac{1}{2}\xi \rho^-(q, q_{goal});$$

$\xi'$ is the dynamic gain coefficient of the attractive force, expressed as $\xi'=k*(e^{-\rho(q,\ q_{goal})})$, where the dynamic gain coefficient is inversely proportional to the distance between the robotic arm and the goal point, with the minimum gain coefficient at the starting point, thereby enabling adjustment of the attractive force magnitude to prevent excessive attraction that could cause collisions between the robotic arm and obstacles, ensuring the robotic arm obtains a safe and smooth path.

The shortest distance between the robotic arm joint points and the obstacle point cloud is determined in real time. When the shortest distance is greater than the set safety distance, the repulsive force of the obstacle on the robotic arm is 0, and when the shortest distance is less than the set safety distance, the magnitude of the repulsive force is determined based on the joint points on the robotic arm and the nearest obstacle point cloud information, and the function formula for the repulsive force magnitude is:

$$F_{repi} = -\nabla(U_{rep}) = \begin{cases} F_{rep1i} + F_{rep2i}, & \rho_i(q, q_{obst}) \le \rho_0 \\ 0, & \rho_i(q, q_{obst}) > \rho_0 \end{cases},$$

where $U_{rep}$ is the repulsive potential field generated by the obstacle; po is the safety distance radius; $\rho_i(q, q_{obst})$ is the Euclidean distance between the robotic arm end and the i-th obstacle;

$F_{rep1i}$ is the repulsive force component, with direction from the obstacle pointing to the robotic arm end, and magnitude is:

$$F_{rep1i} = m \left| \frac{1}{\rho(q, q_{goal})} - \frac{1}{\rho_0} \right| \frac{\rho^n(q, q_{goal})}{\rho_i^2(q, q_{obst})},$$

$F_{rep2i}$ is the attractive force component, with direction from the robotic arm end pointing to the goal point, and magnitude is:

$$F_{rep2i} = \frac{n}{2} m \left| \frac{1}{\rho_i(q, q_{obst})} - \frac{1}{\rho_0} \right| \rho^{n-1}(q, q_{goal}).$$

When the robotic arm uses the local planner to plan the path, the combined force generated by the attractive force and repulsive force guides the movement of the robotic arm.

Step 6: The conventional artificial potential field method suffers from easily falling into local minima and unreachable goal issues. The falling into local minima refers to when the combined force of attraction and repulsion acting on the robotic arm equals zero, causing the robotic arm to stop moving or oscillate. The unreachable goal refers to when the robotic arm moves near the goal point, if there exists a large repulsive force generated by nearby obstacles, it will create obstruction preventing the robotic arm from reaching the goal point. To solve the local minima problem, the improved artificial potential field method introduces a guiding force to the robotic arm end, which enables the robotic arm to move to the next position for re-planning when trapped in a local minimum. The function formula for the guiding force is:

$$F_a = \begin{cases} \begin{cases} 1, & \rho(q, q_{obst}) > \rho_0/2 \\ 0.5, & \rho(q, q_{obst}) \le \rho_0/2 \end{cases}, & s = 1 \\ a*x, & s > 1 \end{cases}.$$

The function formula for the combined force when falling into a local minimum is:

$$F_{comb} = F_{att} + \sum_{i=1}^{s} F_{repi} + F_a,$$

where s is the number of obstacles; a is the guiding force coefficient; the value range of x is $[1,10]$; the value of a varies with the number of obstacles and the distance between the robotic arm and obstacles. When the number of obstacles is 1, if the distance between the robotic arm and the obstacle is greater than half of the safety distance, then a takes the value of 1, otherwise a takes the value of 0.5; when the number of obstacles is greater than 1, a monotonic increasing function is used as the guiding function to assign a value to a until the robotic arm escapes the local minimum point. If the next position still falls into a local minimum, the above method is repeated. To solve the unreachable goal problem, the improved artificial potential field method introduces a distance influence factor to the repulsive force, which changes the magnitude of the repulsive force generated by obstacles near the goal point, making the repulsive force generated by obstacles within a certain distance from the goal point zero, thereby preventing the robotic arm from failing to reach the goal point. When the robotic arm is far from the goal point, it is still affected by the repulsive force from obstacles, retaining obstacle avoiding capability. The improved repulsive force formula is:

$$U_{rci}(q) = \begin{cases} \frac{1}{2} k_{rep} \left( \frac{1}{\rho_i(q, q_{obst})} - \frac{1}{\rho_0} \right)^2 \dot{e}_i(q, q_{obst}), & \rho_i(q, q_{obst}) \le \rho_0 \\ 0, & \rho_i(q, q_{obst}) > \rho_0 \end{cases},$$

where $\dot{e}_i(q, q_{obst})$ represents the unit vector from the i-th obstacle pointing to the robotic arm end; and $k_{rep}$ is a positive real number representing the repulsive force coefficient; and the total repulsive force is the cumulative effect of the repulsive forces from each obstacle.

Step 7: Introducing a pre-planning mechanism in the local path planning. To promptly adapt to dynamic environments and avoid obstacle avoiding failures caused by motion delays, a pre-planning mechanism is introduced in local path planning. The pre-planning mechanism refers to adopting a simultaneous planning-and-moving approach during motion (see FIG. 4). When the robotic arm is moving along the locally planned path S2 based on the previous frame's environmental information and has not yet stopped, it acquires the current frame's environmental information and uses it as data to pre-plan a new local path S3. This local path S3 must be continuous with the previous local path S2, ensuring that when the robotic arm completes its motion along local path S2, it may immediately continue moving along local path S3, thereby maintaining motion continuity.

Step 8: Incorporating a following mechanism in the local path planning. When the robotic arm enters local planning, it may use the combined force and pre-planning mechanism to quickly and safely avoid obstacles, but consequently deviates from the original global path, affecting subsequent motion. Therefore, a following mechanism is introduced (shown in FIG. 5A and FIG. 5B). The following mechanism may be divided into a goal-following mechanism and a path-following mechanism. After completing obstacle avoiding, if the robotic arm may return to the globally planned path under the combined force, it will continue moving toward the goal point along the globally planned path—this is called the path-following mechanism. If the robotic arm may not return to the globally planned path, it will move toward the goal point under the combined force—this is called the goal-following mechanism. The robotic arm employs the following mechanism throughout the entire motion process.

What is claimed is:

1. A robotic arm obstacle avoiding path planning method, comprising the following steps:

step 1: based on a robotic arm model and obstacles, determining robotic arm joint points, and adopting virtual joint interpolation to interpolate connecting rods between adjacent joints; and employing spherical bounding boxes at each joint point to envelop and replace the robotic arm model to facilitate distance calculation when a robotic arm assumes any posture;

step 2: adopting an eye-to-hand configuration to position a depth camera, acquiring real-time point cloud information of the robotic arm and the obstacles in a workspace, using a robot real-time filtering package to filter out the real-time point cloud information of the robotic arm, and retaining only the real-time point cloud information of the obstacles;

step 3: before moving the robotic arm, using a rapidly-exploring random tree connect (RRT-Connect) algorithm to perform path planning in a static environment where the robotic arm is located, and leveraging completeness of the RRT-Connect algorithm to obtain a feasible globally planned path;

step 4: controlling the robotic arm to move along the feasible globally planned path, acquiring the real-time point cloud information of the obstacles in the workspace of the robotic arm, and calculating a distance between a point cloud of an obstacle and the robotic arm joint points in a coordinate system of the robotic arm to obtain a shortest distance;

step 5: implementing obstacle avoiding through local path planning using an artificial potential field method, determining a distance and a position vector between a robotic arm end and a goal point in real time, and determining a magnitude of an attractive force exerted by the goal point on the robotic arm end based on the distance and the position vector between the robotic arm end and the goal point;

wherein the goal point is a goal position where the robotic arm is controlled to reach; and a function formula for determining the distance and the position vector between the robotic arm end and the goal point in real time and determining the magnitude of the attractive force based on the distance and the position vector between the robotic arm end and the goal point is:

$$F_{att} = -\nabla(U_{att}) = \xi' \rho(q, q_{goal}),$$

wherein $\rho$ (q, qgoal) is a Euclidean distance between the robotic arm end and the goal point; Uatt is an attractive potential field function, and $$U_{att} = \frac{1}{2}\xi' \rho^2 (q, q_{goal});$$

and $\xi'$ is a dynamic gain coefficient of the attractive force, expressed as $\xi' = k*(e^{-\rho(q, q_{goal})})$, wherein the dynamic gain coefficient is inversely proportional to a distance between the robotic arm and the goal point, with a minimum gain coefficient at a starting point, thereby enabling adjustment of the magnitude of the attractive force to prevent an excessive attractive force that cause collisions between the robotic arm and the obstacles, and ensuring that the robotic arm obtains a safe and smooth path;

determining the shortest distance between the robotic arm joint points and the point cloud of the obstacle in real time, wherein when the shortest distance is greater than a set safety distance, a repulsive force of the obstacles on the robotic arm is 0, and when the shortest distance is less than the set safety distance, a magnitude of the repulsive force is determined based on the robotic arm joint points and a nearest obstacle point, and a function formula of the magnitude of the repulsive force is:

$$F_{repi} = -\nabla(U_{rep}) = \begin{cases} F_{rep1i} + F_{rep2i}, & \rho_i(q, q_{obst}) \le \rho_0 \\ 0, & \rho_i(q, q_{obst}) > \rho_0 \end{cases},$$

wherein Urep is a repulsive potential field generated by the obstacles; $\rho 0$ is a safety distance radius; $\rho i$ (q, qobst) is a Euclidean distance between the robotic arm end and an i-th obstacle;

Frep1i is a repulsive force component, with direction from the obstacles pointing to the robotic arm end, and magnitude is:

$$F_{rep1i} = m\left|\frac{1}{\rho(q, q_{goal})} - \frac{1}{\rho_0}\right|\frac{\rho^n(q, q_{goal})}{\rho_i^2(q, q_{obst})};$$

wherein Frep2i is an attractive force component, with direction from the robotic arm end pointing to the goal point, and magnitude is:

$$F_{rep2i} = \frac{n}{2}m\left|\frac{1}{\rho_i(q, q_{obst})} - \frac{1}{\rho_0}\right|\rho^{n-1}(q, q_{goal});$$

wherein when the robotic arm uses a local planner to plan the safe and smooth path, a combined force generated by the attractive force and the repulsive force guides movements of the robotic arm;

step 6: introducing a guiding force to the robotic arm end, wherein the guiding force enables the robotic arm to move to a next position for re-planning when the robotic arm is trapped in a local minimum; a function formula of the guiding force is:

$$F_a = \begin{cases} \begin{cases} 1, & \rho(q, q_{obst}) > \rho_0/2 \\ 0.5, & \rho(q, q_{obst}) \le \rho_0/2 \end{cases}, & s = 1 \\ a*x, & s > 1 \end{cases},$$

a function formula of the combined force when falling into the local minimum is:

$$F_{comb} = F_{att} + \sum_{i=1}^{s} F_{repi} + F_a,$$

wherein s is a number of the obstacles; a is a guiding force coefficient; a value range of x is [1, 10]; a value of a varies with the number of the obstacles and a distance between the robotic arm and the obstacles; when the number of the obstacles is 1, if the distance between the robotic arm and the obstacle is greater than half of a safety distance, then a takes a value of 1, otherwise a takes a value of 0.5; when the number of the obstacles is greater than 1, a monotonic increasing function is used as a guiding function to assign the value to a until the robotic arm escapes a local minimum point; and if the next position still falls into the local minimum, the above method is repeated;

step 7: introducing a pre-planning mechanism performed by the local planner in the local path planning; and step 8: incorporating a following mechanism performed by the local planner in the local path planning.

2. The robotic arm obstacle avoiding path planning method according to claim 1, wherein the RRT-Connect algorithm is based on a random sampling method that connects randomly sampled points to form the feasible globally planned path, with a connection process of the RRT-Connect algorithm resembling tree growth, hence termed a random tree, and the RRT-Connect algorithm improves path planning speed by simultaneously growing two random trees from both the starting point and the goal point until convergence of the two random trees to obtain the feasible globally planned path; and to avoid excessive randomness in sampling and enhance path directionality, the RRT-Connect algorithm further adopts an alternating method for random tree growth.

3. The robotic arm obstacle avoiding path planning method according to claim 2, wherein the artificial potential field method introduces a distance influence factor to the repulsive force to modify the magnitude of the repulsive force generated by obstacles near the goal point, making the repulsive force generated by obstacles within a certain distance from the goal point zero to prevent the robotic arm from failing to reach the goal point, while the robotic arm maintains an influence of obstacle repulsive forces when the robotic arm is far from the goal point; and a formula for retaining a repulsive force with an improved obstacle avoiding ability is:

$$U_{rci}(q) = \begin{cases} \frac{1}{2}k_{rep}\left(\frac{1}{\rho_i\,(q,\,q_{obst})} - \frac{1}{\rho_0}\right)^2 \dot{e}_i(q,\,q_{obst}), & \rho_i\,(q,\,q_{obst}) \le \rho_0 \\ 0, & \rho_i\,(q,\,q_{obst}) > \rho_0 \end{cases},$$

wherein $\dot{e}_i(q, q_{obst})$ represents a unit vector from the i-th obstacle pointing to the robotic arm end; krep is a positive real number representing a repulsive force coefficient; and a total repulsive force is a cumulative effect of each obstacle repulsive force.

4. The robotic arm obstacle avoiding path planning method according to claim 3, wherein the pre-planning mechanism adopts a simultaneous planning-and-moving approach during motion; and when the robotic arm is moving along a locally planned path (S2) based on environmental information of a previous frame and has not yet stopped, the robotic arm acquires environmental information of a current frame as data to pre-plan a new local path (S3), requiring the new local path (S3) to be continuous with the locally planned path (S2), enabling the robotic arm to immediately move along the new local path (S3) after completing the motion on the locally planned path (S2), thereby ensuring motion continuity of the robotic arm.

5. The robotic arm obstacle avoiding path planning method according to claim 1, wherein the following mechanism may be divided into a goal-following mechanism and a path-following mechanism; wherein when the robotic arm may return to the feasible globally planned path under the combined force after completing the obstacle avoiding, the robotic arm will continue moving toward the goal point along the feasible globally planned path, and the following mechanism is called the path-following mechanism; if the robotic arm may not return to the feasible globally planned path, the robotic arm will move toward the goal point under the combined force, and the following mechanism is called the goal-following mechanism; and the robotic arm employs the following mechanism throughout an entire motion process.

\* \* \* \* \*